UNITED STATES PATENT OFFICE.

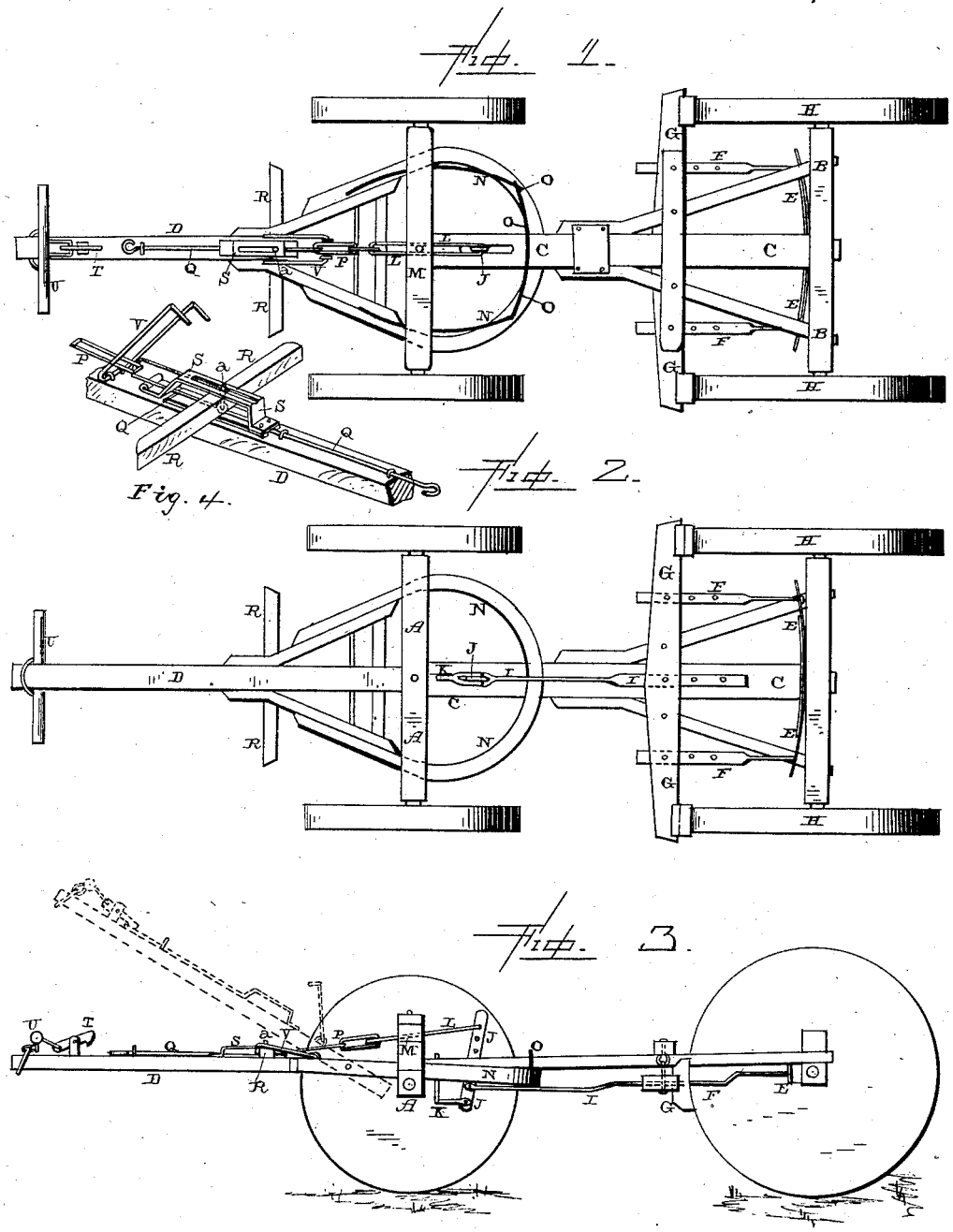

WILLIAM HENRY THORNTON, OF MALTA BEND, MISSOURI.

AUTOMATIC BRAKE.

SPECIFICATION forming part of Letters Patent No. 374,379, dated December 6, 1887.

Application filed May 9, 1887. Serial No. 237,609. (No model.)

*To all whom it may concern:*

Be it known that I, WILLIAM HENRY THORNTON, of Malta Bend, in the county of Saline and State of Missouri, have invented certain new and useful Improvements in Combined Tongue-Supports and Spring-Brakes; and I do hereby declare the following to be a full, clear, and exact description of the invention, such as will enable others skilled in the art to which it pertains to make and use it, reference being had to the accompanying drawings, which form part of this specification.

My invention relates to an improvement in combined tongue-supports and spring-brakes; and it consists in, first, the combination of a spring-actuated brake-bar, a connecting-rod attached thereto, a lever to which the front end of the rod is fastened and which passes up through the reach, connecting-rods, the doubletree, a rod which extends along upon the top of the tongue, and a hook connected to the neck-yoke.

The object of my invention is to attach to the doubletree the rod which is to connect with the hook connected to the neck-yoke for holding the tongue in a raised position, and to attach the brake-bar to the doubletree, so that when the team is pulling the wagon the brake-bar is drawn away from the wheels, and when the team stops the brake-bar is released and at once clamps the wheels.

Figure 1 is a plan view of the wagon to which my invention is applied. Fig. 2 is an inverted view of the same. Fig. 3 is a side elevation with the near wheels removed. Fig. 4 is a detail.

A represents the front axle; B, the rear one; C, the reach, and D the tongue.

Secured to the front side of the rear axle, B, is a suitable flat spring, E, to the ends of which are connected the perforated rods F. These rods extend forward in a line with the reach, and have their front ends fastened to the brake-bar G. The front ends of the rods F are perforated, so that the spring E can be made to exert any desired amount of tension upon the rear wheels, H. This spring E is intended to keep the brakes applied to the wheels H all the time that the wagon is not moving forward. When the team moves forward, the brakes are drawn away from the wheels; but as soon as the team stops the spring E pulls the brakes back in contact with them.

Fastened to the brake-bar near its center is the connecting-rod I, which has a series of perforations through its rear end, so that the brake-bar can be adjusted thereon at the same time that it is being adjusted upon the perforated rods F. The front end of this rod I is fastened to the lever J, which is pivoted at its lower end upon a suitable support, K, fastened to the under side of the reach C, and which lever J projects up through a slot in the reach to any desired distance. Through the upper end of this lever J are formed perforations, so that the connecting-rod L, which is attached to it, can be adjusted up and down, according to the distance it is desired that the lever L shall move the rod. The connecting-rod L passes through the front bolster, M, which turns freely upon the king-bolt, and is thus made to follow the movements of the rod I and lever J as they sweep around through a portion of a circle. The fifth-wheel or hounds N, secured to the axle, extend a suitable distance backward and form a support for the reach. Upon the top of the reach is secured a suitable guide, O, which extends across above the top of the reach, as shown.

The connecting-rod L is connected to one or more links, P, at its front end, so as to allow the tongue to be freely raised upward without cramping or bending it, and these links P are connected at their front end to the rod Q, which extends along the top of the tongue D. Fastened to this rod Q by means of a pin or bolt is the doubletree R, over the top of which is passed the slotted casting S, which serves as a guide to the doubletree in its movements. This slotted guide is hinged at its rear end to a plate which is secured directly to the top of the tongue D. The pin $a$, which serves as a pivot upon which the doubletree R turns, has its upper end to pass through the slot in the guide S, and thus keeps the doubletree always in position. The rod Q is bent double at its rear end, so as to be fastened both to the top and under side of the doubletree, and extends forward at its front end through suitable guides upon the top of the tongue any desired distance. The front end of this rod Q is formed into a ring, so as to engage with the hook T, pivoted upon the top of the front end of the tongue, and which is connected at its front end by means of a loop with the neck-yoke U. When the doubletree is drawn forward, the rod Q is also forced forward, so that its front end engages with the hook T. In this position the tongue is held in a raised position, as shown. When the tongue is disengaged from the hook T, it drops downward.

Hinged upon the top of the tongue, in the rear of the guide S, is a double hook, V, which when lowered into position catches over the top of the doubletree R and prevents it from being drawn forward when the team starts. When this hook is raised upward, the doubletree is left free to be moved forward when the team starts, as above described, so as to draw the brake away from the wheels. While the tongue is in a horizontal position the doubletree is moved backward against the rear end of the slotted guide S. When the tongue is raised upward, the loops allow this doubletree to be forced forward, so as to move the rod Q to that point where connection can be made with the hook T, so as to hold the tongue in position.

It will be seen from the construction above described that a brake mechanism and a tongue-support are combined together.

Having thus described my invention, I claim—

The combination of the rear axle, the spring connected directly thereto, the rods F, which are connected to the ends of the spring, the brake-bar which extends across from wheel to wheel, the hind wheels, the connecting-rod I, having its rear end secured to the brake-bar G, the lever J, which passes up through the reach, the rod L, the links, the tongue, the doubletree, and the guide in which the doubletree moves, substantially as shown.

In testimony whereof I affix my signature in presence of two witnesses.

WILLIAM HENRY THORNTON.

Witnesses:
J. F. COLEMAN,
H. C. McCONNELL.